(No Model.) 2 Sheets—Sheet 1.

L. M. BERTHON.
PHOTOGRAPHIC CAMERA.

No. 419,910. Patented Jan. 21, 1890.

Witnesses

Georges Freydier Dubreuil
Jean Germain

Inventor

Louis Mathieu Berthon (No Model.) 2 Sheets—Sheet 2.

L. M. BERTHON.
PHOTOGRAPHIC CAMERA.

No. 419,910. Patented Jan. 21, 1890.

Witnesses  
Georges Freydier Dubreuil  
Jean Germain

Inventor  
Louis Mathieu Berthon

UNITED STATES PATENT OFFICE.

LOUIS MATHIEU BERTHON, OF THE CASTLE OF ASSIEUX, NEAR ROUSSILLON, ISÈRE, FRANCE.

PHOTOGRAPHIC CAMERA.

SPECIFICATION forming part of Letters Patent No. 419,910, dated January 21, 1890.

Application filed July 18, 1889. Serial No. 317,928. (No model.) Patented in France November 11, 1886, No. 179,596, and in Germany December 2, 1886, No. 42,010.

*To all whom it may concern:*

Be it known that I, LOUIS MATHIEU BERTHON, a citizen of the Republic of France, residing at the Castle of Assieux, near Roussillon, (Isère,) France, have invented new and useful Improvements Relating to Photographic Cameras, (for which I have obtained patents in the following countries: France, No. 179,596, filed November 11, 1886, and in Germany, No. 42,010, filed December 2, 1886,) of which the following is a specification, reference being had to the accompanying drawings.

This invention relates to apparatus used with objectives of a camera obscura.

The improved apparatus, constructed according to the said invention, serves to obviate the use of the ground glass for focusing in photographic operations, and is designed to enable the immediate focusing of objects situated at any distance from the objective or the camera obscura. It is carried out in two arrangements, which are based upon the fact that a definite proportion exists between the space through which an objective must be displaced in order to obtain a clear image of the same object situated at different distances and the angles formed by the visual rays which pass from the eye of the operator to the lower and upper extremities of the object in its different positions. In the arrangement shown on Sheet 1 the above-mentioned proportion is supposed to be constant, which may be considered nearly correct only for great distances, while in the general arrangement of the apparatus illustrated on Sheet 2 the proportion above mentioned is in every case determined by a device which is hereinafter described.

Figure 1:
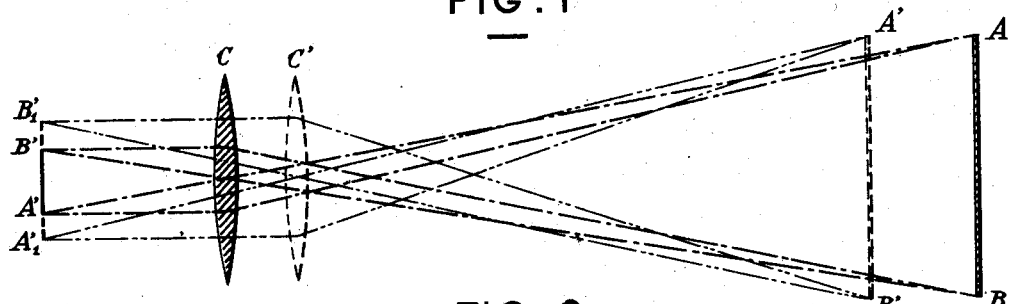
Figure 2:
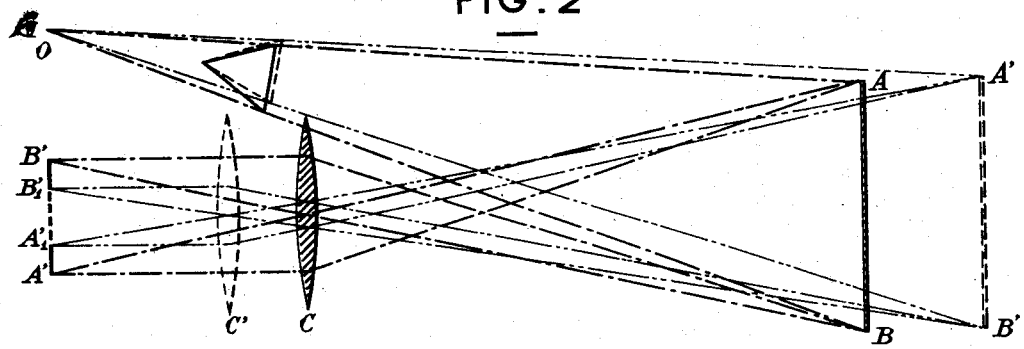
Figure 3:
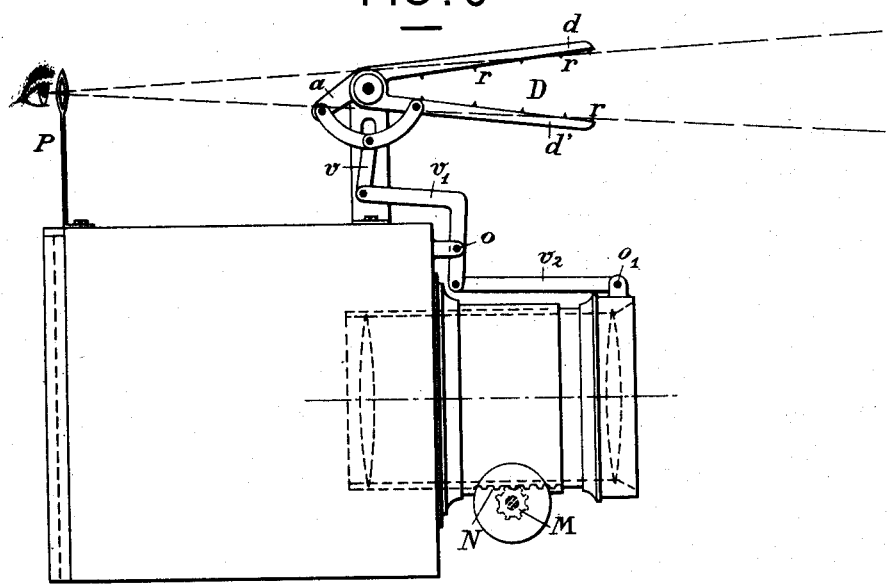
Figure 4:
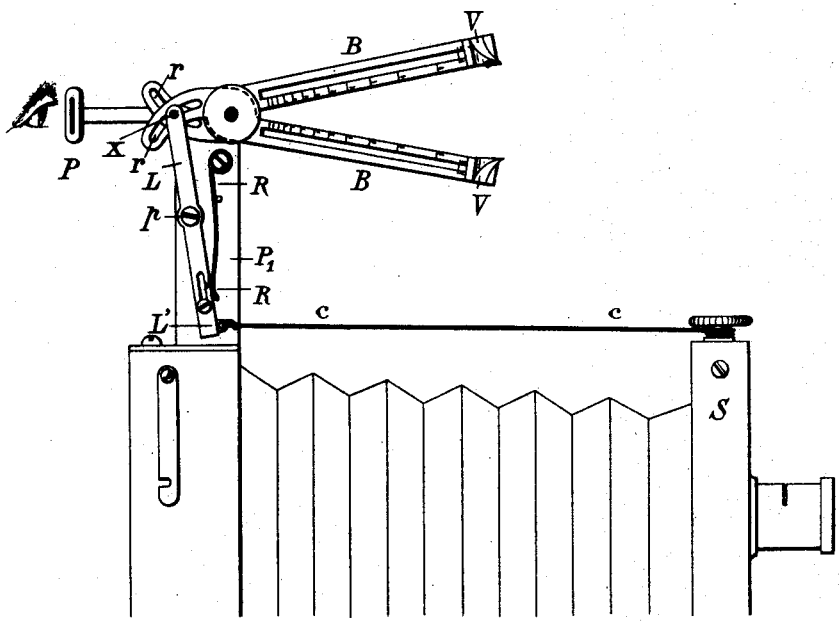
Figure 5:
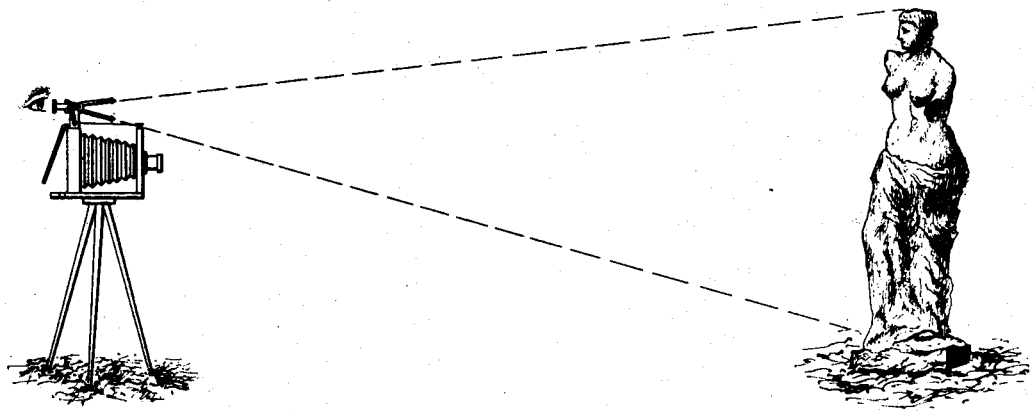

Figures 1 and 2 represent the lens forming the objective in the two positions which it occupies when the object is at A B and when it has been shifted to A' B', in Fig. 2 being moreover represented the angles formed by the visual rays of the operator, which pass at the same time the upper and lower extremities of the object in the two positions, and the arms of the so-called "compass," hereinafter described. Fig. 3 represents a front view of the apparatus serving for great distances. Fig. 4 represents a front view of the improved apparatus serving for any distances. Fig. 5 represents the mode of using the apparatus.

For the purpose of measuring the visual angle, or, in other words, the angle formed by the visual rays passing from the eye of the operator to the lower and upper extremities of the object in its different positions, a compass D is employed, the arms $d$ $d'$ of which are connected with the mechanism for imparting motion to the objective, and which is placed above the latter or the sensitive glass. In the arrangement shown in Fig. 3 the said compass has on its upper arm an extension $a$, and the displacements of the objective are effected, together with those of the compass, through the medium of the lever $v$, the bell-crank lever $v'$, oscillating upon the axis $o$, and the lever $v^2$, pivoted at $o'$. Through the medium of a knob, which is provided with a pinion M, engaging with a rack N, the objective can be displaced. It will thus be seen that the movements of the objective and of the compass are rendered interdependent, or the angle formed between the arms of the compass or the visual angle depends upon and is placed in a definite relation to the displacement of the objective.

A sight P is placed above the sensitive glass at the level of the compass, and enables the objects which are to be focused to be seen between the open points of the said compass. Lateral points $r$ are fixed upon the arms of the compass, as shown in the figures. They are designed to serve as marks for focusing objects of different heights.

To adjust the apparatus, a man of ordinary height is placed in front at a suitable distance, so that his image will occupy the greatest part of the glass with exactitude and without any deformity, and is focused with the aid of the ground glass. The compass is now opened and the points are caused to coincide with the head and feet of the man after having put the eye to the sight, whereupon the compass is connected with the objective, as above stated. It will now be easy to focus a man of ordinary height at once, as for this purpose it is sufficient to sight him through the sight and between the arms of the compass. To effect this the objective is caused to advance or recede through the medium of the above-mentioned knob, in consequence of which the angle between the arms will vary, and the movement is then continued until the aforesaid arms will coincide with the upper and lower extremities of the object. By this operation the objective will be placed in a proper position for focusing, for the angles at which the operator sees the object at the different distances are always proportionate to the displacement of the objective. This is, however, only true for great distances, and the arrangement represented in Fig. 3 is only applicable in this case.

To render the apparatus applicable to the immediate focusing, irrespective of the distance at which the object is situated, the arrangement represented in Fig. 4 is employed.

In order to understand the operation of the same, suppose an object of invariable height which recedes from the eye. In proportion as the object recedes its relative height diminishes, and the reverse happens if the object approaches instead of receding. This variation in the relative height is nearly proportional to the variation in the distance, and if the said relative height has diminished, say, one-half or one-third, the distance of the object has doubled or trebled, and vice versa. Moreover, it is well known that the farther an object whose image is projected by a lens upon a plate or screen recedes from the lens the shorter become the focuses necessary for rendering the image clear with each fresh distance. It will thus be seen that when the distance varies the relative height of the object will vary proportionately to it; but the displacements of the objective will be smaller as the object recedes. Accordingly there is a variable proportion, (which can be considered constant for great distances,) the determination of which forms the object of the arrangement shown in Fig. 3. The said proportion can be determined either theoretically or practically; but only the practical solution realized by the arrangement shown in Fig. 4 is hereinafter described. In this arrangement the compass comprises a sight P and two arms B B, mounted upon a stand P' above the sensitive glass, a metric scale being provided upon the said arms, and two lateral points or slides V V being adapted to be displaced thereon, so that the arms will be of a length which is proportional to the height of the model. Furthermore, a lever L L' is pivoted at $p$ and connected by a slightly-stretched cord with the objective, or with the front part of the camera obscura S, the length of the said lever being such that when it turns upon its pivot the point of attachment L' of the cord can pass through a space equal to the distance which separates the principal focus of the objective from its longest useful focus.

The upper part of this lever is provided with a point X, which is displaced in two slots $r$ $r$, formed obliquely and in different directions in the prolongations of the arms of the compass, and which is invariably at the intersection of these prolongations. By reason of its connection with the objective the lever L L' will transmit the movements of this latter to the arms of the compass, and vice versa. A spring R R, which bears against the lever L L', tends to keep the arms of the compass closed.

In the apparatus hereinbefore described the point X will describe a curve, and to each of its positions will correspond a focus of the objective. Now to a given position of the point X corresponds an opening of the compass, which is determined by the angle formed by the visual rays passing from the eye to the object through the slides of the said compass. This position of the point X must correspond precisely with the useful focus of the objective for the object thus sighted. It is therefore necessary to determine the curve, or rather the form, to be given to the grooves or slots in the prolongations of the arms of the compass, the intersection of which gives successively for different angles between the arms the different points of this curve. The two extreme points of the aforesaid curve—that is to say, those corresponding to the smallest and greatest opening of the compass or to the shortest and longest focus of the objective—are obtained in the following manner: An object that is sufficiently far away is focused. Then after having fixed the compass above the ground glass its arms are placed at the smallest angle by closing them. The said arms are next connected to the principal focus by attaching the cord of the lever at S to the front part of the camera obscura and putting it under a sufficient tension, so that in the slightest backward movement of the ground glass the arms of the compass will commence to open. By this means the shortest focus of the objective is obtained, and if the position which the point X must occupy is marked an extreme point of the said curve is determined. In order to obtain the greatest angle between the arms of the compass and the longest useful focus of the objective—that is to say, the one which provides upon the ground glass the clearest and the greatest possible image of the object, the height of which has been arbitrarily chosen as the extreme limit of the operation of the apparatus—it is sufficient for the purposes of instantaneous photography, which is mainly designed for the reproduction of persons, to take as the height which has to be reproduced most frequently that of a man of medium height—say 1.80 meters. This height serves to determine the greatest angle of the compass, for which purpose a rule of 1.80 is placed vertically before the objective at the distance necessary to obtain upon the plate a clear image, and the position of the objective will furnish the longest useful focus of the latter. Consequently the point X will occupy the extreme position of the curve. Between these two extreme focuses of the objective will be a series of focuses, which are determined by varying the position of the object, whose height remains constant, and sighting it by means of the arms of the compass. To each position will therefore correspond a certain opening between the arms of the compass, a focus of the objective, and consequently a part of the curve described by the point X. The slots in the prolongation of the arms of the compass are by these means accurately determined, so that to each displacement of the object will correspond a definite opening of the compass, and consequently a position of the point X and the position of the objective adapted for the focusing.

In case the height chosen for comparison, 1.80 meter, is to be modified. The fixed projecting point mentioned in the arrangement shown in Fig. 3 can be replaced, as represented in Fig. 4, by two slides, which are adapted to be displaced upon the arms of the compass, and which are arrested at the desired graduation upon these arms. The visual rays will then pass between the points of these slides and terminate at the lower and upper extremities of the object sighted. If desired, this compass can be pointed in the opposite direction, and can also be made double—that is to say, of the form of an X— each of these compasses being employed for sighting an object for which the unit or quantity selected for comparison is different.

What I claim is—

1. The combination, with the objective or camera obscura, of a measuring-compass for measuring the distance of the object from the objective, substantially as described.

2. The combination, with the movable objective, of a compass adjusted in unison with the movement of the objective, substantially as described.

3. The combination, with the movable part of a camera obscura, of a compass comprising two pivoted arms connected to and adjusted in unison with the adjustment of the movable part of the camera obscura, substantially as described.

4. The combination, with the movable part of a camera obscura, of a compass comprising pivoted arms and a pivoted lever connected with the arms and with the movable part of the camera obscura, substantially as described.

5. The combination, with the objective, of a measuring apparatus and means for simultaneously adjusting the measuring apparatus and the objective, substantially as described.

6. The combination, with the objective, of a compass having its pivoted arms provided with slots, and a lever connected with the arms and objective, substantially as described.

7. The combination, with the objective, of a compass having its pivoted arms provided with projecting points for measuring objects of different height, substantially as described.

In testimony whereof I have hereunto signed my name in the presence of two subscribing witnesses.

LOUIS MATHIEU BERTHON.

Witnesses:
GEORGES TREYDIER DUBREUL,
JEAN GERMAIN.